(12) United States Patent
Radic

(10) Patent No.: US 10,778,103 B2
(45) Date of Patent: Sep. 15, 2020

(54) DIGITALLY COMPENSATED CURRENT SENSING PROTECTION

(71) Applicant: Silanna Asia Pte Ltd, Singapore (SG)

(72) Inventor: Aleksandar Radic, Toronto (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 16/837,487

(22) Filed: Apr. 1, 2020

(65) Prior Publication Data
US 2020/0235671 A1 Jul. 23, 2020

Related U.S. Application Data

(63) Continuation of application No. PCT/IB2019/059810, filed on Nov. 15, 2019.

(60) Provisional application No. 62/772,502, filed on Nov. 28, 2018.

(51) Int. Cl.
H02M 3/335 (2006.01)

(52) U.S. Cl.
CPC ... H02M 3/33515 (2013.01); H02M 3/33523 (2013.01)

(58) Field of Classification Search
CPC ............... H02M 3/33515; H02M 3/33523
See application file for complete search history.

(56) References Cited

U.S. PATENT DOCUMENTS

| 7,505,287 B1 * | 3/2009 | Kesterson | ......... | H02M 3/33507 363/21.01 |
| 10,063,153 B2 * | 8/2018 | Fang | ................. | H02M 3/33507 |
| 10,193,451 B2 * | 1/2019 | Luo | ................... | H02M 3/33507 |
| 10,291,131 B2 * | 5/2019 | Lin | .................... | H02M 3/33523 |
| 10,461,626 B1 * | 10/2019 | Radic | ..................... | H02M 1/08 |
| 2006/0227476 A1 | 10/2006 | Yang | | |

(Continued)

FOREIGN PATENT DOCUMENTS

| CN | 104467430 A | 3/2015 |
| JP | 2001298949 A | 10/2001 |

(Continued)

OTHER PUBLICATIONS

International Search Report dated Feb. 20, 2020 for PCT Patent Application No. PCT/IB2019/059810.

*Primary Examiner* — Yusef A Ahmed
(74) *Attorney, Agent, or Firm* — MLO, a professional corp.

(57) ABSTRACT

An apparatus for controlling a power converter includes an analog-to-digital converter to generate a digital representation of a voltage sense signal indicative of an input voltage of the power converter. The apparatus includes a first comparison circuit to generate a first comparison signal using a current sense signal indicative of a current through a primary-side switch of the power converter. The apparatus includes a gate driver to provide a gate drive signal to the primary-side switch based on a control signal, and a digital controller. The digital controller is configured to produce a time scalar value using the digital representation of the voltage sense signal, produce a timing signal using the control signal and the first comparison signal, scale the timing signal using the time scalar value, and adjust a timing of the control signal to limit a peak current through the primary-side switch based on the scaled timing signal.

18 Claims, 7 Drawing Sheets

(56) References Cited

U.S. PATENT DOCUMENTS

| | | | |
|---|---|---|---|
| 2007/0132438 A1* | 6/2007 | Jang | H02M 1/36 323/282 |
| 2008/0272748 A1* | 11/2008 | Melanson | H02M 1/4225 323/207 |
| 2010/0149712 A1 | 6/2010 | Wang et al. | |
| 2010/0220503 A1 | 9/2010 | Djenguerian et al. | |
| 2012/0262961 A1* | 10/2012 | Chien | H02M 3/33507 363/84 |
| 2014/0268459 A1 | 9/2014 | Robinson et al. | |
| 2015/0229223 A1* | 8/2015 | Cao | H02M 1/08 363/21.13 |
| 2015/0311810 A1* | 10/2015 | Chen | H02M 3/33515 363/21.13 |
| 2016/0087523 A1* | 3/2016 | Liu | H05B 45/37 363/21.12 |
| 2016/0190936 A1 | 6/2016 | Ke | |
| 2016/0226239 A1* | 8/2016 | Yang | H02M 1/32 |
| 2016/0315541 A1* | 10/2016 | Chen | H02H 7/1213 |
| 2016/0329819 A1* | 11/2016 | Chen | H02M 3/33592 |
| 2016/0352237 A1* | 12/2016 | Quigley | H02M 3/33515 |
| 2017/0149340 A1* | 5/2017 | Ye | H02M 3/33507 |
| 2017/0187292 A1* | 6/2017 | Schaemann | H02M 3/33507 |
| 2017/0302184 A1* | 10/2017 | Chen | H02M 3/33523 |
| 2018/0007751 A1* | 1/2018 | Gritti | H02M 3/33507 |
| 2018/0013353 A1* | 1/2018 | Nate | H02M 3/33523 |
| 2019/0252966 A1* | 8/2019 | Radic | H02M 1/08 |
| 2019/0356231 A1* | 11/2019 | Radic | H02M 3/33507 |
| 2020/0112241 A1* | 4/2020 | Wang | H02M 1/08 |

FOREIGN PATENT DOCUMENTS

| | | |
|---|---|---|
| JP | 2012070548 A | 4/2012 |
| JP | 2014236639 A | 12/2014 |

\* cited by examiner

DIGITALLY COMPENSATED CURRENT SENSING PROTECTION

RELATED APPLICATIONS

This application is a continuation of PCT International Application No. PCT/IB2019/059810, filed on Nov. 15, 2019, and entitled "Digitally Compensated Current Sensing Protection", which claims the benefit of U.S. Provisional Patent Application No. 62/722,502, filed on Nov. 28, 2018, and entitled "Digitally Compensated Current Sensing Protection", all of which are hereby incorporated by reference in their entirety for all purposes.

BACKGROUND

Power converters, such as flyback converters and other switch-mode power supplies, are common in modern power supplies and are utilized in both alternating current ("AC") to direct current ("DC") conversion, and DC-to-DC conversion with galvanic isolation between the input and outputs of the power supply. In general, a flyback converter is a power converter having a magnetic element that is split to form a transformer which provides the galvanic isolation. In general, a flyback converter has a primary-side and secondary-side. The primary-side of the flyback converter includes a primary-side switch (such as, for example, a transistor), and the secondary-side includes another switch (such as, for example, a diode) to rectify the current produced by the secondary-side of the flyback converter. In operation, flyback converters generally operate in a switched-mode that periodically turns on and off the primary-side switch that supplies current to the magnetic element.

Peak-current limiting is implemented in flyback converters to ensure that a current through the magnetic element is controlled below a saturation limit of the magnetic element. Additionally, peak-current limiting is implemented in flyback converters to ensure that a maximum sustained power of the flyback converter is maintained at a level that is equal to or less than a power level that the flyback converter can sustain in terms of temperature, voltage, and/or current stress. However, as an input voltage (i.e., a bulk voltage) of the flyback converter varies, a given current through the magnetic element will produce a respective varying power. Thus, primary-side current limiting sometimes includes provisions to compensate for such input voltage variation to achieve constant power limiting of the flyback converter.

SUMMARY

In some embodiments, an apparatus for controlling a power converter includes an analog-to-digital converter (ADC) to receive a voltage sense signal and to generate a digital representation of the voltage sense signal. The voltage sense signal is indicative of an input voltage of the power converter. The apparatus further includes a first comparison circuit to receive a current sense signal and to generate a first comparison signal based on the current sense signal. The current sense signal is indicative of a current through a primary-side switch of the power converter. The apparatus further includes a gate driver circuit to receive a control signal and to provide a gate drive signal to the primary-side switch based on the control signal, and a digital controller. The digital controller is configured to produce a time scalar value using the digital representation of the voltage sense signal, produce a timing signal using the control signal and the first comparison signal, scale the timing signal using the time scalar value, and adjust a timing of the control signal to limit a peak current through the primary-side switch based on the scaled timing signal.

In some embodiments, a method involves receiving a voltage sense signal that is indicative of an input voltage of a power converter. A current sense signal that is indicative of a current through a primary-side switch of the power converter is received. The primary-side switch is controlled by a control signal. A time scalar value that is inversely proportional to a voltage level of the received voltage sense signal is produced. A timing signal is produced using the control signal and the received current sense signal. The timing signal is scaled using the time scalar value, and a timing of the control signal is adjusted to limit a peak current through the primary-side switch based on the scaled timing signal.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

DETAILED DESCRIPTION

Figure 1:
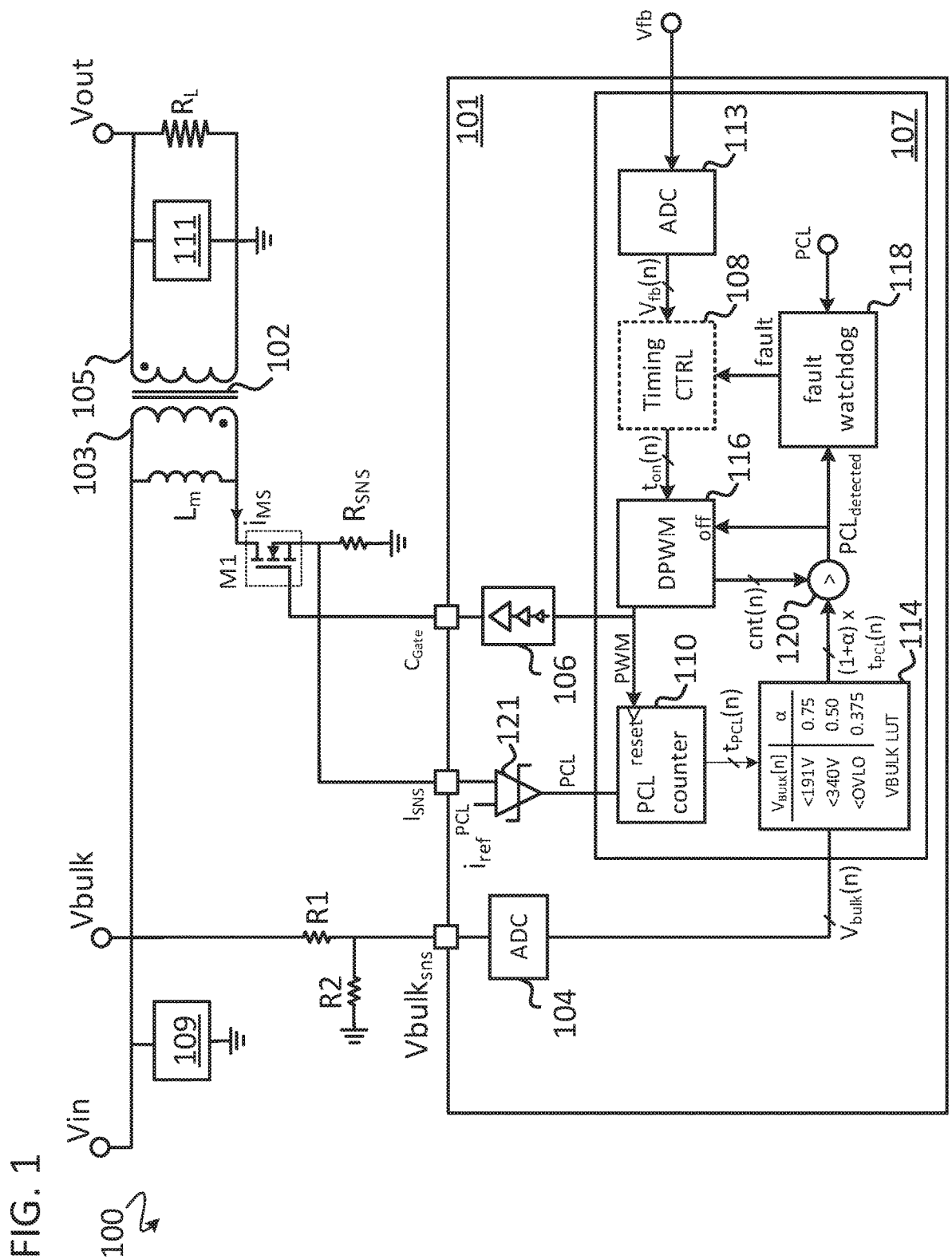
FIG. 1 is a simplified circuit schematic of a portion of a power converter, in accordance with some embodiments.

Peak-current limiting is often implemented to ensure that a current through a magnetic element of a power converter (e.g., through a winding of a transformer of the power converter) is controlled below a saturation limit of the magnetic element. Constant over-power limiting is often implemented to ensure that a maximum sustained power of the converter is equal to or less than that which the converter can sustain, in terms of temperature, voltage and/or current stress. When utilizing a primary-side current sensing method of the power converter, compensation for input voltage variation (e.g., of a filtered input voltage or bulk voltage) is implemented to achieve a constant over-power limit. For example, if no input voltage compensation is utilized, for a given constant peak-current limit the power limit at a high line voltage (e.g., 230 Vrms) of the power converter can be up to 2-times higher than at a lower line voltage (e.g., 115 Vrms) of the power converter. Conventional solutions may implement input voltage compensation using analog circuits which vary an analog trip-point reference based on a sensed input voltage and/or a sensed current. However, such conventional analog voltage/current level trip point implementations may suffer from significant errors over process and temperature variations.

Some embodiments described herein involve implementing, for a flyback-based power converter ("power converter"), programmable primary-side current-based peak-current limiting, constant over-power limiting, and light-load peak-current limiting (skip-pulse current limiting). As disclosed, such implementations advantageously use a hardware efficient (e.g., not requiring a large number of digital blocks or circuit area to implement) primary-side controller that is generally not negatively impacted by process and temperature variations of the power converter. The primary-side controller is advantageously configured to receive a current sense signal indicative of, or proportional to, a current through a primary-side switch of the power converter. In some embodiments, the current sense signal is produced using a single sense resistor coupled to the primary-side switch. The primary-side controller advantageously uses a hardware efficient comparator to compare the received current sense signal to a fixed overcurrent threshold voltage to determine an overcurrent and/or overload event of the power converter while still compensating for varying input voltages of the power converter. Because the overcurrent threshold voltage is fixed, the primary-side controller does not require a hardware inefficient (e.g., requiring a large number of digital blocks or circuit area to implement) digital-to-analog converter (DAC) to generate a varying overcurrent threshold voltage. Similarly, the power converter advantageously does not need an analog circuit to generate a varying overcurrent threshold voltage, as such analog circuits may be sensitive to process and temperature variations. Instead, as will be disclosed, in some embodiments the primary-side controller advantageously implements programmable primary-side current-based peak-current limiting and constant over-power limiting with compensation for varying input voltages of the power converter. In accordance with some embodiments, such peak-current limiting and over-power limiting is based on a comparison of an on-time of the primary-side switch to a scaled timing signal generated using the current sense signal. In such embodiments, the scaled timing signal is scaled according to an input voltage of the power converter.

Additionally, in some embodiments a comparison of the current sense signal to a fixed current threshold voltage is advantageously used at the primary-side controller to implement skip-pulse peak-current limiting to reduce audible noise during skip-pulse operation and to ensure a "bumpless" transition between skip-pulse and quasi-resonant (QR) modes of operation during light-load operating conditions of the power converter.

As described above, in some embodiments, a power converter uses a digitally compensated peak-current limit implementation to limit a maximum transformer magnetizing inductance current with reduced sensitivity to power converter input voltage (e.g., bulk voltage) variation. FIG. 1 shows a simplified circuit diagram of a portion of a power converter 100 which implements such over-power protection and peak-current limit protection, in accordance with some embodiments. In general, the power converter 100 includes a primary-side controller 101, a primary-side switch M1, a current sense resistor $R_{SNS}$, a voltage divider circuit that includes resistors R1, R2, an input filter 109, an output filter 111, and a transformer 102. The transformer 102 couples a primary-side (i.e., an input) of the power converter 100 at a primary-side winding 103 of the transformer 102 to a secondary-side (i.e., an output) of the power converter 100 at a secondary-side winding 105 of the transformer 102. Also shown is a visualization of a magnetizing inductance $L_M$ of the transformer 102.

The primary-side controller 101 generally includes an analog to digital converter (ADC) 104, a gate driver circuit 106, a digital controller 107, and an analog comparison block 121. In some embodiments, the analog comparison block 121 performs a comparison using hysteresis (i.e., a fixed rising threshold value is different than a fixed falling threshold value). The digital controller 107 generally includes an optional duty-cycle timing optimization block 108 ("Timing CTRL"), a peak-current limit (PCL) counter block 110, an ADC 113, a VBULK look-up-table (LUT) block 114, a digital pulse-width modulation signal (DPWM) block 116, a fault watchdog block 118, and a digital comparison block 120. The elements of the power converter 100 are coupled as shown in FIG. 1. Some elements of the power converter 100 have been omitted from FIG. 1 for simplification of this description but are understood to be present. In some embodiments, the digital controller 107 is implemented by a field-programmable gate array circuit (FPGA), an application-specific integrated circuit (ASIC), a microcontroller, a microprocessor, or by another digital circuit operable to implement the blocks 108-120.

An input voltage Vin is received at the input filter 109 (e.g., a capacitor, a signal conditioning circuit, and/or a rectifier) which converts the input voltage Vin to a filtered bulk input voltage Vbulk. The filtered bulk input voltage Vbulk is received at the voltage divider R1, R2, which produces an attenuated voltage sense signal $Vbulk_{SNS}$.

A transformer magnetizing inductance current $i_{MS}$ through the primary-side switch M1 is received at the sense resistor $R_{SNS}$. The sense resistor $R_{SNS}$ produces a current sense signal $I_{SNS}$ that is indicative of the current $i_{MS}$. In some embodiments, the sense resistor $R_{SNS}$ is a resistor that is external to the primary-side controller 101.

The output filter 111 on the secondary-side of the power converter 100 is coupled to the secondary-side winding 105 to produce an output voltage Vout which is received by a load $R_L$. In some embodiments, the output filter 111 includes one or more capacitors and a synchronous rectifier switch, such as a diode or an actively controlled synchronous rectifier switch.

In general, the primary-side controller 101 of the power converter 100 enables and disables the primary-side switch M1 to control the current is through the primary-side winding 103 to generate the output voltage Vout at the secondary-side of the power converter 100. A feedback voltage Vfb based on the output voltage Vout of the power converter 100 is received by the ADC 113. The ADC 113 generates a digital feedback representation $V_{fb}(n)$ based on the received feedback voltage Vfb. In some embodiments, the ADC 113 is implemented outside of the digital controller 107. In some embodiments, the feedback voltage Vfb is produced by a feedback circuit (not shown) coupled between the output of the power converter 100 and the primary-side controller 101. In some embodiments, the feedback circuit may generate Vfb based on a difference between Vout and a reference voltage. The digital feedback representation $V_{fb}(n)$ is received by the optional duty-cycle timing optimization block 108, which provides a desired primary-side switch M1 on-time signal $t_{on}(n)$ to the DPWM block 116. In some embodiments, the optional duty-cycle timing optimization block 108 produces an on-time signal $t_{on}(n)$ in accordance with a power conversion efficiency optimization process. In other embodiments, $V_{fb}(n)$ is received by the DPWM or another module to determine the on-time signal $t_{on}(n)$. The DPWM block 116 generates a pulse-width modulation (PWM) control signal based on the received or determined on-time signal $t_{on}(n)$. The PWM control signal is received by the gate driver circuit 106 which produces a gate drive signal $C_{Gate}$ to enable and disable the primary-side switch M1. The PWM control signal is also received by the PCL counter block 110, as will be described.

Peak-Current Limiting

When the gate drive signal $C_{Gate}$ transitions high, in some embodiments, the primary-side switch M1 is enabled (turned on) and the transformer magnetizing inductance current $i_{MS}$ begins to ramp up and flow through the primary-side switch M1 and the sense resistor $R_{SNS}$. At the same time, the PCL counter block 110 also receives the PWM control signal at a reset input ("reset") and thereby resets and begins to measure a duration of time, for example by commencing a count sequence to count a number of clock cycles (e.g., using a clock internal to the PCL counter block 110 or a clock of the digital controller 107, the clock having a much higher frequency than a frequency at which the PWM control signal is generated). As the current is flows through the primary-side switch M1, the current sense signal $I_{SNS}$ developed at the sense resistor $R_{SNS}$ may cross a fixed rising threshold voltage $i_{ref}^{PCL}$ (e.g., 180 mV, or other appropriate value). The analog comparison block 121 compares the current sense signal $I_{SNS}$ to the fixed threshold voltage $i_{ref}^{PCL}$ and emits an asserted comparison signal "PCL" upon determining that the current sense signal $I_{SNS}$ exceeds the fixed threshold voltage $i_{ref}^{PCL}$. Upon receiving the asserted comparison signal PCL, the PCL counter block 110 finalizes the measurement of the duration of time, for example by finalizing (i.e., determining a final count value) or stopping the count sequence that began upon receiving the PWM control signal, and transmits a timing signal $t_{PCL}(n)$ representative of the measured duration of time to the VBULK LUT block 114.

The attenuated voltage sense signal Vbulk$_{SNS}$ (which is indicative of the filtered input voltage Vbulk of the power converter 100) is received by the ADC 104, which produces a digital representation $V_{bulk}(n)$ of the attenuated voltage sense signal Vbulk$_{SNS}$. The VBULK LUT block 114 receives the digital representation $V_{bulk}(n)$ and uses the digital representation $V_{bulk}(n)$ to retrieve a value of a peak-current limit scalar a (i.e., a time scalar value) that corresponds to a voltage range of the input voltage of the power converter 100 (e.g., as shown in the table 400 of FIG. 4). In some embodiments, a value of the time scalar value α is inversely proportional to a value of the filtered input voltage Vbulk. The time scalar value α is a discrete value, that is, the time scalar value α is of a stepwise function where each different time scalar value α corresponds to a range of input voltage values. In other embodiments, the time scalar value α is a continuous value, i.e., is of a continuous linear or non-linear function of input voltage.

The timing signal $t_{PCL}(n)$ value is multiplied by (1+α) within the VBULK LUT block 114 or by another block of the digital controller 107. The product (i.e., a scaled timing signal $(1+α) \times t_{PCL}(n)$) is compared, by the digital comparison block 120, to a DPWM counter value, cnt(n), generated by the DPWM block 116. The counter value cnt(n) is representative of an on-time of the primary-side switch M1. If the count value cnt(n) increases beyond the peak-current time limit $(1+α) \times t_{PCL}(n)$, an asserted PCL$_{detected}$ signal is produced by the digital comparison block 120. Upon receiving the asserted PCL$_{detected}$ signal at an "off" input, the DPWM block 116 transitions the PWM control signal low, thereby disabling the primary-side switch M1, in some embodiments. Additionally, the PCL$_{detected}$ signal is received by the fault watchdog block 118. In order to support transient peak-current operation, the fault watchdog block 118 determines whether the PCL$_{detected}$ signal is received a threshold number of times during a maximum number of switching cycles before issuing an over-power protection fault signal "fault" for the power converter 100. Upon receiving the fault signal, the duty-cycle timing optimization block 108 causes the DPWM block 116 to disable the primary-side switch M1. In other embodiments, the fault signal is received directly at the DPWM block 116, which upon receiving the fault signal disables the primary-side switch M1. In some embodiments, the fault watchdog block 118 emits the over-power protection fault signal after receiving the asserted PCL$_{detected}$ signal for about 500 switching cycles over a duration of about 10 ms. In some embodiments, the fault watchdog block 118 is configured to receive the comparison signal PCL from the analog comparison block 121. In the case where the current sense signal $I_{SNS}$ remains high (i.e., is greater than $i_{ref}^{PCL}$ after the primary-side switch M1 is disabled, the primary-side controller 101 immediately goes into fault mode protection and remains in the fault mode until PCL transitions low. Thus, the primary-side controller 101 effectively provides a programmable digitally compensated time-based peak-current limit for the power converter 100.

Figure 2:
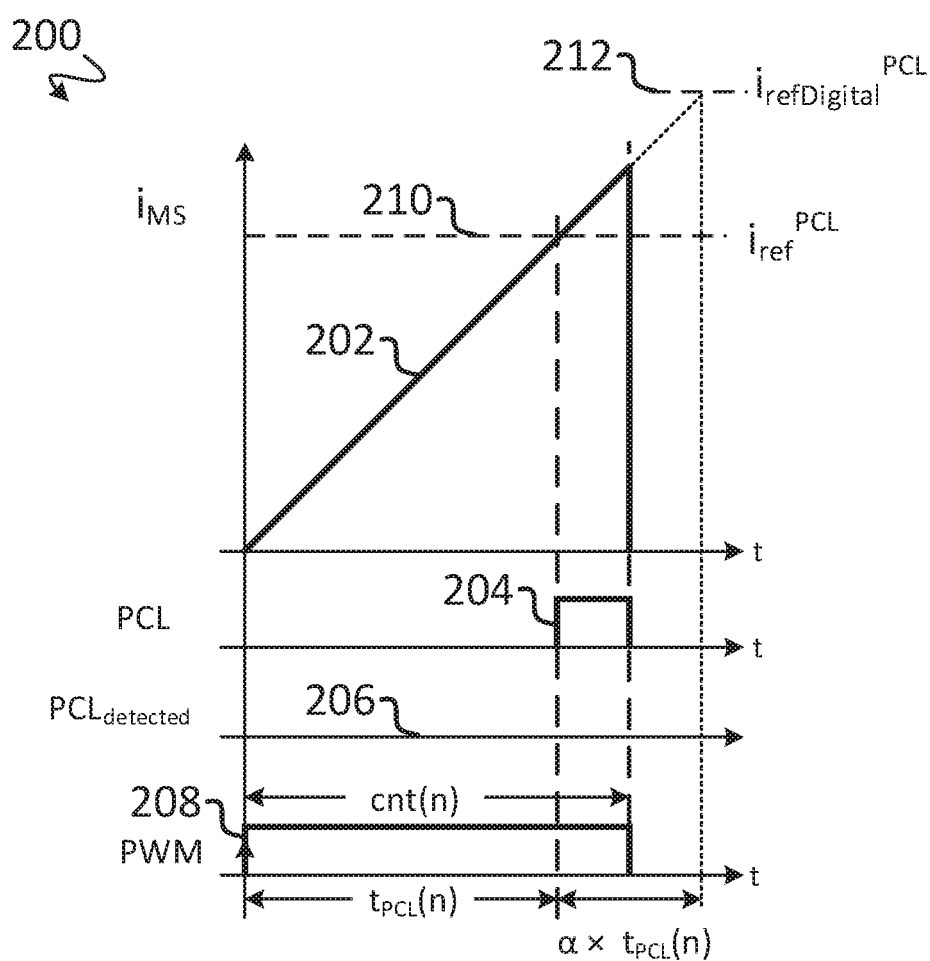
FIGS. 2-3 illustrate key current and digital waveforms of the power converter shown in FIG. 1, in accordance with some embodiments.

Key analog and digital waveforms related to the operation of the power converter 100 are shown in FIG. 2, in accordance with some embodiments. Plots 200 include a plot 202 of the current $i_{MS}$ through the primary-side switch M1 over time t, a plot 204 of the comparison signal PCL over time t, a plot 206 of the PCL$_{detected}$ signal over time t, and a plot 208 of the PWM control signal over time t. Also shown is a representation 210 of the fixed current limit $i_{ref}^{PCL}$ used by the analog comparison block 121 which compares the current sense signal $I_{SNS}$ to the fixed overcurrent threshold voltage $i_{ref}^{PCL}$, and a representation 212 of a digitally compensated overcurrent threshold $i_{refDigital}^{PCL}$. The digitally compensated overcurrent threshold $i_{refDigital}^{PCL}$ is representative of the digitally compensated time-based peak-current embodied by the scaled timing signal. As shown in the plots 200, the timing signal $t_{PCL}(n)$ (generated by the PCL counter block 110) corresponds to the time between when the PWM control signal 208 transitions to an asserted state (thereby commencing a count sequence at the PCL counter block 110) and when the PCL signal 204 transitions to an asserted state (thereby finalizing the count sequence at the PCL counter block 110). In the example shown in the plots 200, the PCL$_{detected}$ signal 206 is not asserted by the digital comparison block 120 because the count value cnt(n) of the PWM control signal 208 (representative of an on-time of the primary-side switch M1) does not exceed a duration of time that is equal to the timing signal $t_{PCL}(n)$ plus the quantity of the timing signal $t_{PCL}(n)$ multiplied by the time scalar value α, i.e., $t_{PCL}(n) \times (1+α)$ and thus the current is 202 through the primary-side switch M1 does not exceed the digitally compensated overcurrent threshold $i_{refDigital}^{PCL}$ 212.

Figures 3, 4:
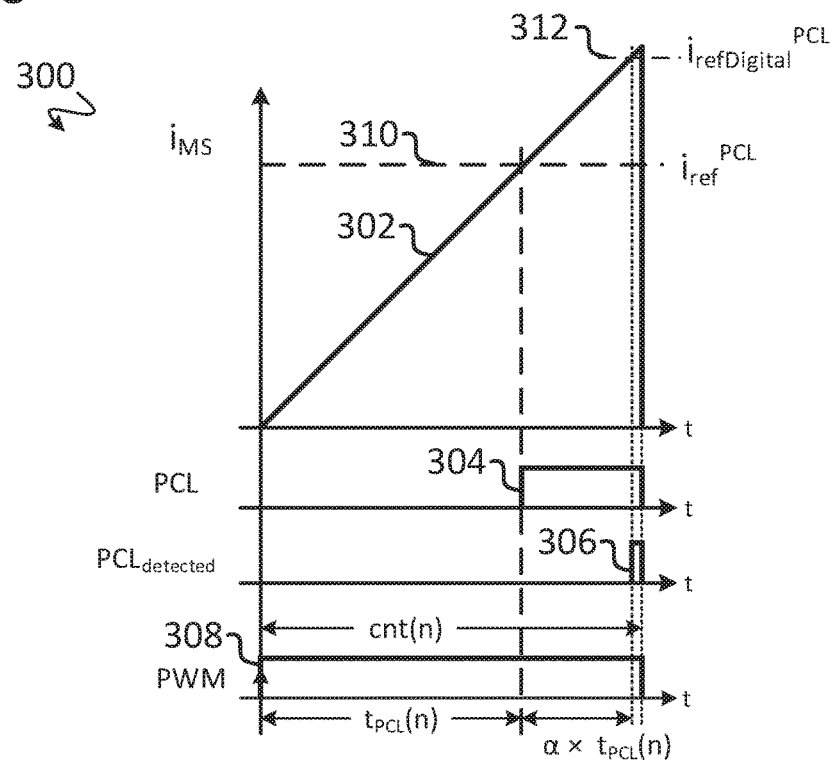
FIG. 4 is a table of time value scalars corresponding to ranges of input voltages for use by the power converter shown in FIG. 1, in accordance with some embodiments.

In another example, additional key analog and digital waveforms related to the operation of the power converter 100 are shown in FIG. 3, in accordance with some embodiments. Plots 300 include a plot 302 of the current is through the primary-side switch M1 over time t, a plot 304 of the comparison signal PCL over time t, a plot 306 of the $PCL_{detected}$ signal over time t, and a plot 308 of the PWM control signal over time t. Also shown is a representation 310 of the fixed current limit provided by the analog comparison block 121 and a representation 312 of a digitally compensated overcurrent threshold $i_{refDigital}^{PCL}$. As shown in the plots 300, the timing signal $t_{PCL}(n)$ (generated by the PCL counter block 110) corresponds to the time between when the PWM control signal 308 transitions to an asserted state (thereby commencing a count sequence at the PCL counter block 110) and the PCL signal 304 transitions to an asserted state (thereby finalizing the count sequence at the PCL counter block 110). In the example shown in the plots 300, the $PCL_{detected}$ signal (plot 306) is asserted by the digital comparison block 120 because the duration cnt(n) of the PWM control signal 308 (representative of an on-time of the primary-side switch M1) exceeds a duration of time that is equal to the timing signal $t_{PCL}(n)$ plus the timing signal $t_{PCL}(n)$ multiplied by the time scalar value α, i.e., $t_{PCL}(n) \times (1+\alpha)$ and thus the current $i_{MS}$ 302 through the primary-side switch M1 exceeds the digitally compensated overcurrent threshold $i_{refDigital}^{PCL}$ 312.

Over-Power Protection

In order to implement flat over-power protection irrespective of the filtered input voltage Vbulk, the peak-current limit scalar (α) ("time scalar value") is dynamically adjusted (i.e., compensated) based on the digital representation $V_{bulk}(n)$ of the attenuated voltage sense signal $Vbulk_{SNS}$. Thus, the time scalar value α is a function of the filtered input voltage Vbulk, as illustrated in the table 400 of FIG. 4 and as embodied by the VBULK LUT block 114. For example, as shown in the table 400, if a voltage level of the filtered input voltage Vbulk as represented by the digital representation Vbulk(n) is less than 191V, the time scalar value α is 0.75. If a voltage level of the filtered input voltage Vbulk as represented by the digital representation Vbulk(n) is greater than or equal to 191V and less than 340V, the time scalar value α is 0.50. If a voltage level of the filtered input voltage Vbulk as represented by the digital representation Vbulk(n) is greater than or equal to 340V and less than an overvoltage lockout voltage (OVLO), the time scalar value α is 0.375. Thus, the value of the time scalar value α is inversely proportional to the voltage level of the filtered input voltage Vbulk and the inverse proportionality is described by a stepwise linear function. In some embodiments, there are more than three values of the time scalar value α. In some embodiments, the values of the time scalar value α may be different than those shown in the table 400 and/or the ranges of the filtered input voltage Vbulk may be different than those shown in the table 400. Based on the values stored within and retrieved by the VBULK LUT block 114, a peak-current $i_{peak}$ of the power converter 100 becomes a stepwise linear function and the over-power limit becomes flatter as compared to a power converter that does not compensate for varying input voltage. A value of the peak-current $i_{peak}$ is given by equation (1) as $$i_{peak} = (1+\alpha) \cdot \frac{i_{ref}^{PCL}}{R_{SNS}} = \frac{1}{\eta} \cdot \frac{2 \cdot P_{out}}{n} \cdot \left(1 + \frac{n \cdot v_{out}}{v_{in}} + \frac{t_{QR}}{t_{off}}\right) \approx \frac{1}{\eta} \cdot \frac{2 \cdot P_{out}}{n} \cdot \left(1.1 + \frac{n \cdot v_{out}}{v_{in}}\right) \quad (1)$$

where $i_{ref}^{PCL}$ is, for example, 180 mV, $R_{SNS}$ is a resistance value of the sense resistor, $P_{out}$ is a maximum output power of the power converter 100, $t_{QR}$ is a quasi-resonant half-period of the power converter 100, $V_{out}$ is the output voltage (Vout) of the power converter 100, η is a power processing efficiency, and $v_{in}$ is the input voltage (Vin) of the power converter 100.

Figure 5:
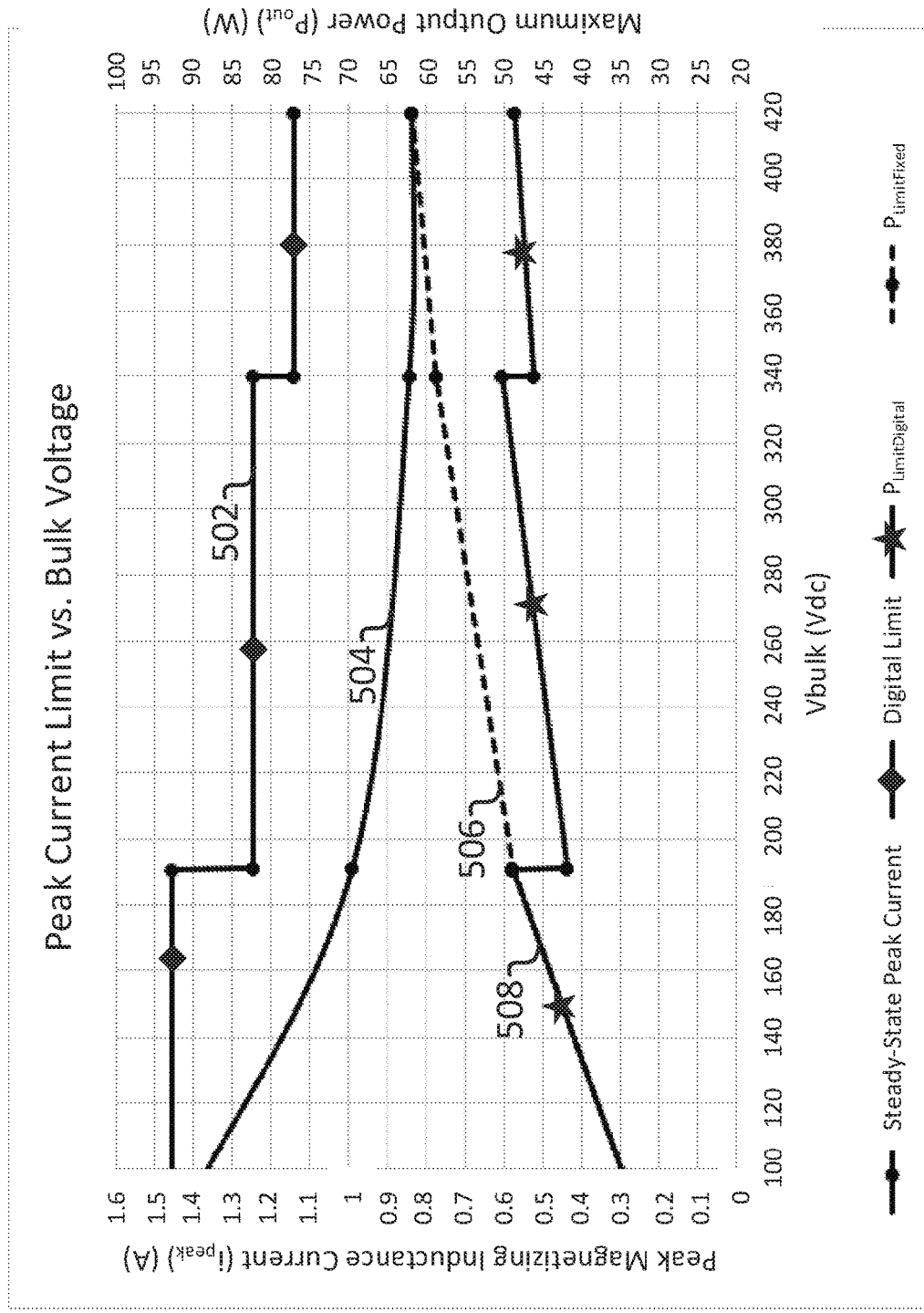
FIG. 5 illustrates peak-current limits/power limits versus input voltage, used by the converter shown in FIG. 1, in accordance with some embodiments.

FIG. 5 provides an example plot 500 of waveforms related to the operation of the power converter 100, in accordance with some embodiments. The plot 500 illustrates a peak magnetizing inductance current ($i_{peak}$) in amps and maximum output power ($P_{out}$) in watts as a function of the filtered input voltage Vbulk. The plot 500 includes a plot 502 ("Digital Limit") representing a stepwise version of the digital peak-current limit $i_{peak}$ ("Steady-State Peak-current") 504, a plot 506 ("$P_{LimitFixed}$") which is an example of a power limit of the power converter 100 without digitally compensated current and power limiting, and a plot 508 ("$P_{LimitDigital}$") which is an example of a power limit of the power converter 100 when digitally compensated current and power limiting is implemented by the digital controller 107, in accordance with some embodiments. As shown in FIG. 5, the plot 508 is advantageously flatter or has a smaller range than the plot 506 as Vbulk rises.

Skip-pulse Current Limiting

Figure 6:
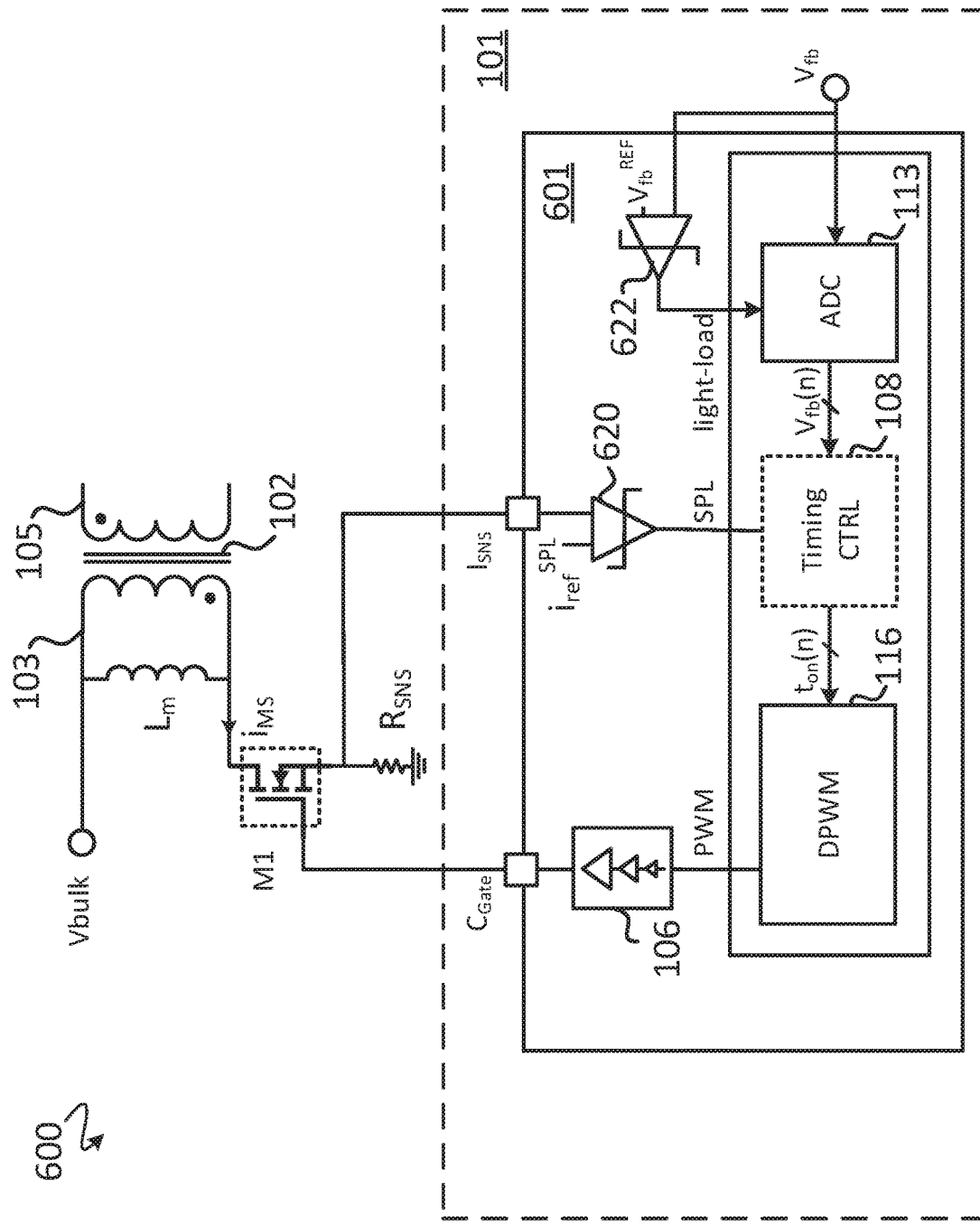
FIG. 6 is a diagram of a portion of the power converter of FIG. 1, in accordance with some embodiments.

FIG. 6 shows a simplified circuit diagram of a portion 600 of the power converter 100, in accordance with some embodiments. Some elements of the power converter 100 have been omitted from FIG. 6 for simplification of description but are understood to be present. In general, the portion 600 of the power converter 100 includes the transformer 102 having the primary-side winding 103 and the secondary-side winding 105, the primary-side switch M1, the sense resistor $R_{SNS}$, and a skip-pulse current limiting circuit 601 of the primary-side controller 101. In other embodiments, the skip-pulse current limiting circuit 601 is implemented in a power converter that does not include the digital controller 107. That is, in such embodiments, the skip-pulse current limiting circuit 601 is implemented as an independent circuit of a power converter that may or may not include the digital controller 107. The skip-pulse current limiting circuit 601 generally includes the gate driver circuit 106, the DPWM block 116, and also includes the optional duty-cycle timing optimization block 108, the ADC 113, and analog comparison blocks 620, 622, coupled as shown in FIG. 6. In some embodiments, the analog comparison blocks 620, 622 implement hysteresis in a manner similar to that described for the analog comparison block 121. When the current sense signal $I_{SNS}$ rises above a reference voltage threshold $i_{ref}^{SPL}$, an asserted current limit signal "SPL" is produced by the analog comparison circuit 620. The skip-pulse current limiting circuit 601 advantageously achieves constant minimum peak-current during skip-pulse operation and smooth skip-pulse mode to quasi-resonant (QR) mode transitions during light-load operation of the power converter 100.

As shown, the feedback voltage $V_{fb}$ based on the output voltage Vout of the power converter 100 is received at the ADC 113 and at the analog comparison circuit 622 of the skip-pulse current limiting circuit 601. When the feedback voltage $V_{fb}$ falls below a falling threshold of $V_{fb}^{REF}$ (e.g., 600 mV or other appropriate value), the analog comparison circuit 622 emits an asserted light-load signal ("light-load") to the ADC 113, which causes the gate drive signal $C_{Gate}$ to be disabled (held low) to disable the primary-side switch M1 for one or more subsequent switching cycles. In other embodiments, the light-load signal is received at one or both of the blocks 108, 116 which subsequently cause the primary-side switch M1 to be disabled for one or more subsequent switching cycles. Once $V_{fb}$ rises above a rising threshold of $V_{fb}^{REF}$ (e.g., 620 mV or other appropriate value), the gate drive signal $C_{Gate}$ signal is enabled and held high until i) the current sense signal $I_{SNS}$ rises above the reference voltage threshold $i_{ref}^{SPL}$ (thereby causing the analog comparison circuit 620 to produce an asserted SPL signal) and a count value of the DPWM block 116 (e.g., cnt(n)) is greater than $t_{on}(n)$, or ii) the SPL signal is low and the count value cnt(n) of the DPWM block 116 is greater than a threshold count value (e.g., a count equivalent to 5.82 us or other appropriate value), at which point a comparator fault is triggered. The hysteresis (e.g., falling threshold/ rising threshold) of the analog comparison circuit 622 can be programmed or selected at design time.

Figure 7:
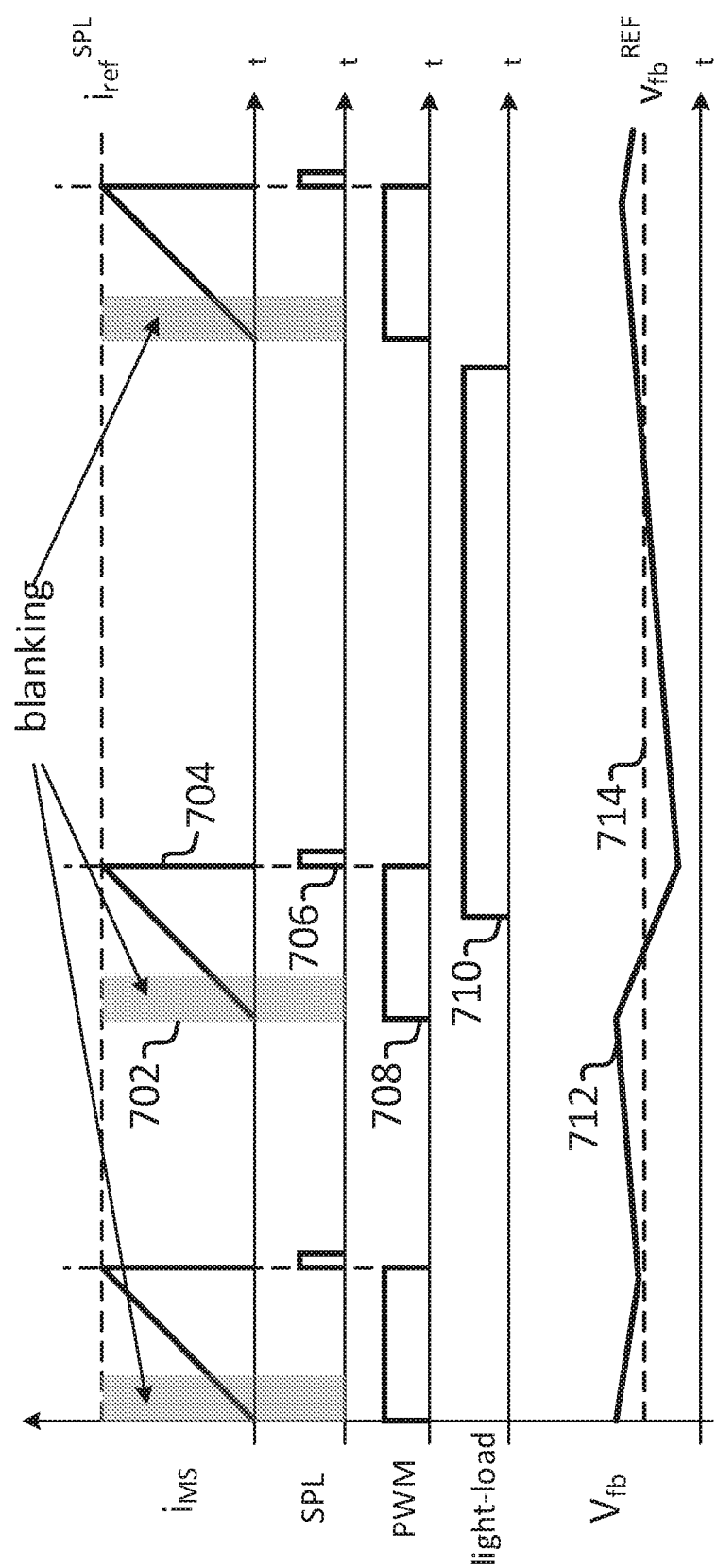
FIG. 7 illustrates key current and digital waveforms of the converter shown in FIG. 6, in accordance with some embodiments.

Key analog and digital waveforms related to the operation of the power converter 100 implementing the skip-pulse current limiting circuit 601 are shown in a plot 700 of FIG. 7, in accordance with some embodiments. The plot 700 includes a plot 702 of blanking periods, a plot 704 of the current is through the primary-side switch M1, a plot 706 of the overcurrent signal SPL, a plot 708 of the PWM control signal, a plot 710 of the light-load signal, a plot 712 of the feedback voltage $V_{fb}$, and a representation 714 of the threshold voltage $V_{fb}^{REF}$. The blanking periods 702 disable overcurrent sensing for a short time each time the primary-side switch M1 is enabled (i.e., after the start of each pulse of the PWM control signal 708) to filter out transient/ spurious detection of an overcurrent event. As shown in the plots 700, the light-load signal (plot 710) is enabled when the feedback voltage $V_{fb}$ falls below the threshold voltage $V_{fb}^{REF}$, thereby disabling the PWM control signal 708 (and the gate drive signal $C_{Gate}$) during a subsequent switching cycle. Additionally, the PWM control signal 708 (and thereby the gate drive signal $C_{Gate}$) is also disabled in response to an asserted overcurrent signal SPL 706. When the feedback voltage $V_{fb}$ rises above the threshold voltage $V_{fb}^{REF}$, the PWM control signal (plot 708) (and thereby the gate drive signal $C_{Gate}$) is enabled during a subsequent switching cycle.

Figure 8:
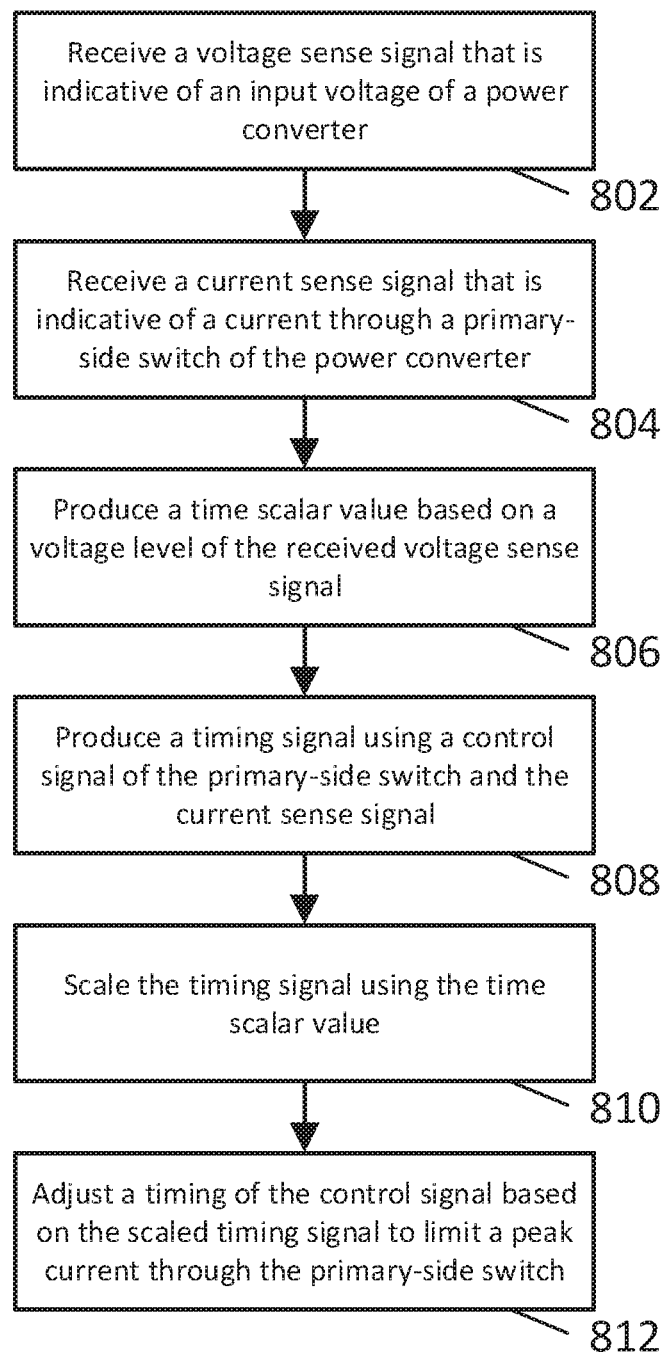
FIG. 8 illustrates a portion of an example process implemented by the power converter of FIG. 1, in accordance with some embodiments.

FIG. 8 is a portion of an example process 800 for digitally compensated current sensing protection of a power converter (100), in accordance with some embodiments. The particular steps, order of steps, and the combination of steps are shown for illustrative and explanatory purposes only. Other embodiments can implement different particular steps, orders of steps, and combinations of steps to achieve similar functions or results. In some embodiments, all or a portion of the steps of the process 800 are performed by the primary-side controller 101, and in particular, the digital controller 107. At step 802, the attenuated voltage sense signal Vbulk$_{sns}$ that is indicative of the input voltage (Vbulk) of the power converter (100) is received (e.g., by the ADC 104). At step 804, the current sense signal $I_{SNS}$ that is representative of the current $i_{MS}$ through the primary-side switch (M1) of the power converter 100 is received. At step 806, the time scalar value α based on the digital representation $V_{bulk}(n)$ of the attenuated voltage sense signal Vbulk$_{SNS}$ is produced. At step 808, the timing signal $t_{PCL}(n)$ is produced using a PWM control signal of the primary-side switch and the current sense signal (e.g., using PCL, generated using a comparison of $I_{SNS}$ to $i_{ref}^{PCL}$). At step 810, the timing signal is scaled using the time scalar value, then, at step 812, a timing of the control signal is adjusted (e.g., the primary-side switch M1 may be turned off before $t_{on}(n)$ has elapsed) based on the scaled timing signal to limit a peak-current through the primary-side switch (M1).

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An apparatus for controlling a power converter, the apparatus comprising:
   an analog-to-digital converter (ADC) to receive a voltage sense signal and to generate a digital representation of the voltage sense signal, the voltage sense signal being indicative of an input voltage of the power converter;
   a first comparison circuit to receive a current sense signal and to generate a first comparison signal based on the current sense signal, the current sense signal being indicative of a current through a primary-side switch of the power converter;
   a gate driver circuit to receive a control signal and to provide a gate drive signal to the primary-side switch based on the control signal; and
   a digital controller configured to:
   produce a time scalar value using the digital representation of the voltage sense signal, the time scalar value being inversely proportional to a voltage level of the voltage sense signal;
   produce a timing signal using the control signal and the first comparison signal;
   scale the timing signal using the time scalar value; and
   adjust a timing of the control signal to limit a peak current through the primary-side switch based on the scaled timing signal.

2. The apparatus of claim 1, wherein:
   the time scalar value is one value of a set of discrete time scalar values, each time scalar value of the set of discrete time scalar values corresponding to a voltage level range for the voltage sense signal, the set of discrete time scalar values being in accordance with a stepwise linear function.

3. The apparatus of claim 2, wherein:
   the digital controller comprises a look-up-table (LUT), the LUT comprising the set of discrete time scalar values.

4. The apparatus of claim 1, wherein:
   the digital controller comprises a look-up-table (LUT) comprising a plurality of discrete time scalar values and a plurality of ranges for the voltage sense signal, each of the discrete time scalar values corresponding to one of the ranges for the voltage sense signal; and the digital controller is configured to produce the time scalar value by retrieving, from the LUT, a discrete time scalar value of the plurality of discrete time scalar values that corresponds to the range of the plurality of ranges within which the voltage sense signal occurs.

5. The apparatus of claim 4, wherein:
a first discrete time scalar value of the plurality of discrete time scalar values corresponds to a first range of the plurality of ranges for the voltage sense signal;
a second discrete time scalar value of the plurality of discrete time scalar values corresponds to a second range of the plurality of ranges for the voltage sense signal; and
the first discrete time scalar value is greater than the second discrete time scalar value and a maximum value of the first range is less than a maximum value of the second range.

6. The apparatus of claim 1, further comprising:
a second comparison circuit to receive a feedback sense signal and to generate a second comparison signal based on the feedback sense signal, the feedback sense signal being indicative of an output voltage level of the power converter;
wherein the digital controller is further configured to:
disable the primary-side switch for one or more subsequent switching cycles of the power converter in response to a first level of the second comparison signal; and
subsequently enable the primary-side switch in response to a second level of the second comparison signal.

7. The apparatus of claim 6, wherein:
the digital controller is further configured to:
further subsequently disable the primary-side switch in response to criteria that comprises a determination that the current sense signal is greater than a current sense threshold.

8. The apparatus of claim 7, wherein:
the current sense threshold is of a different value than a threshold used by the first comparison circuit.

9. The apparatus of claim 1, wherein:
the digital controller further comprises:
a counter block configured to receive the control signal and the first comparison signal, the counter block commencing a count sequence upon receiving the control signal and finalizing the count sequence upon receiving the first comparison signal, the finalized count sequence being used as the timing signal.

10. The apparatus of claim 9, wherein:
the digital controller is further configured to adjust the control signal by turning the primary-side switch off in response to determining, by the digital controller, that a primary-side switch on-time count value is greater than the scaled timing signal, the primary-side switch on-time count value corresponding to an on time of the primary-side switch.

11. The apparatus of claim 9, wherein:
the digital controller comprises a look-up-table (LUT) comprising a plurality of discrete time scalar values and a plurality of ranges for the voltage sense signal, each of the discrete time scalar values corresponding to one of the ranges for the voltage sense signal; and
the digital controller is configured to produce the time scalar value by retrieving, from the LUT, a discrete time scalar value of the plurality of discrete time scalar values that corresponds to the range of the plurality of ranges within which the voltage sense signal occurs.

12. The apparatus of claim 9, wherein:
the digital controller further comprises:
a digital pulse-width modulation (DPWM) block configured to produce the control signal and to produce a primary-side switch on-time count value that corresponds to an on-time of the primary-side switch.

13. The apparatus of claim 12, wherein:
the digital controller further comprises:
a digital comparison block configured to compare the scaled timing signal to the primary-side switch on-time count value, the digital comparison block being configured to generate an overcurrent detected signal upon determining that the primary-side switch on-time count value is greater than the scaled timing signal.

14. The apparatus of claim 13, wherein:
the DPWM block is configured to turn off the primary-side switch using the control signal upon receiving the overcurrent detected signal.

15. A method comprising:
receiving a digital representation of a voltage sense signal that is indicative of an input voltage of a power converter;
receiving a current sense signal that is indicative of a current through a primary-side switch of the power converter, the primary-side switch being controlled by a control signal;
producing a time scalar value using the digital representation of the voltage sense signal, the time scalar value being inversely proportional to a voltage level of the voltage sense signal;
producing a timing signal using the control signal and the received current sense signal;
scaling the timing signal using the time scalar value; and
adjusting a timing of the control signal to limit a peak current through the primary-side switch based on the scaled timing signal.

16. The method of claim 15, further comprising:
determining an on-time of the primary-side switch;
comparing the determined on-time of the primary-side switch to the scaled timing signal; and
adjusting the timing of the control signal by disabling the primary-side switch upon determining that the on-time of the primary-side switch is greater than the scaled timing signal.

17. The method of claim 15, further comprising:
producing the time scalar value by retrieving a discrete time value from a look-up-table using the voltage sense signal.

18. The method of claim 15, wherein:
producing the timing signal comprises:
commencing a count sequence upon receiving the control signal;
comparing the current sense signal to a threshold value;
finalizing the count sequence upon determining that the current sense signal exceeds the threshold value; and
using a value of the finalized count sequence as the timing signal.

* * * * *